3,403,101
SULPHUR- AND CHLORINE-CONTAINING E.P. ADDITIVES FOR LUBRICANTS

Keith George Allum, Bagshot, Surrey, and John Frederick Ford, Camberley, Surrey, England, assignors to The British Petroleum Company Limited, London, England, a corporation of Great Britain
No Drawing. Filed Mar. 24, 1965, Ser. No. 442,543
Claims priority, application Great Britain, Apr. 9, 1964, 14,682/64
5 Claims. (Cl. 252—48.4)

This invention relates to sulphur- and chlorine-containing additives for improving the load-carrying or extreme pressure (E.P.) properties of lubricants.

It is known to prepare such additives by reacting hydrocarbons or certain derivatives thereof with a sulphochlorinating agent such as thionyl chloride but we have now discovered that the load carrying properties of such additives can be improved by carrying out the reaction with thionyl chloride in the presence of a Friedel-Crafts catalyst under substantially non-polymerising conditions.

According to the invention therefore a sulphur- and chlorine-containing additive for lubricating oils is prepared by reacting a hydrocarbon or an oxygenated hydrocarbon having, in either case, olefinic unsaturation with thionyl chloride in the presence of a Friedel-Crafts catalyst, the reaction being carried out at a temperature within the range 50° to —50° C., preferably 10° to —10° C., using 0.1 to 10, preferably 0.5 to 3 moles of hydrocarbon or oxygenated hydrocarbon per mole of thionyl chloride and a molar amount of thionyl chloride which is not less than the molar amount of Friedel-Crafts catalyst.

The hydrocarbon or oxygenated hydrocarbon is preferably one having between 4 and 35 carbon atoms and no free hydroxyl groups. Examples of oxygenated hydrocarbons that may be used are esters, ethers, and ketones.

A particularly suitable Friedel-Crafts catalyst is aluminium chloride. Other catalysts that may be used include zinc chloride, antimony chloride, ferric chloride, stannic chloride, titanium tetrachloride, boron trifluoride and hydrogen fluoride or mixtures thereof.

The reaction should preferably be carried out in an inert solvent such as chlorinated hydrocarbon e.g. ethyl bromide, ethyl chloride, carbon tetrachloride or methylene dichloride.

The invention also includes sulphur- and chlorine-containing additives for lubricating oils, prepared by the method described above.

The invention further includes a lubricating composition consisting essentially of a lubricating base oil (which may be mineral or synthetic) and a minor proportion, e.g. 0.1 to 10% by weight of the composition, of a sulphur- and chlorine-containing additive as specified above.

Actual preparations of two additives according to the invention (Additives A and B) will now be described by way of example and, for the sake of comparison, the preparation of two additives (P and Q) made without the use of aluminium chloride is also described.

Additive A

Materials used:
Octene-1 (redistilled)—45 g., 0.4 mole
Thionyl chloride (redistilled)—24.0 g., 0.2 mole
Aluminium chloride (resublimed)—25.68 g., 0.19 mole
Ethyl bromide (dry)—200 ml.

The olefin was added to the solution of aluminium chloride and thionyl chloride in ethyl bromide at 0° C. over 2 hours, under nitrogen. The solution was then stirred at 2° C. for 2 hours and then allowed to warm up to room temperature overnight. Water was added to destroy the aluminium chloride and the aqueous layer separated off. The ethyl bromide was removed and replaced with carbon tetrachloride. This solution was then washed 3 times with distilled water and then refluxed for 3 hours in the presence of distilled water. The aqueous layer was separated and the carbon tetrachloride solution washed 3 times with distilled water (washings neutral) and dried over sodium sulphate. The solution was then filtered and the solvent removed.

The product had a chlorine content of 25% wt., a sulphur content of 6.8% wt., and an aluminium content of nil.

Additive P

Materials used:
Octene-1 (redistilled)—41 g., 0.365 mole
Thionyl chloride (redistilled)—21.2 g., 0.178 mole
Ethyl bromide (dry)—200 ml.

The experimental procedure was the same as for Additive A.

The product had a chlorine content of 0.47% wt. and a sulphur content of 0.13% wt.

Additive B

Materials used:
Butyl oleate (dry)—81 g., 0.24 mole
Thionyl chloride (redistilled)—13.8 g., 0.116 mole
Aluminium chloride (resublimed)—15.5 g., 0.116 mole
Ethyl bromide (dry)—200 ml.

The butyl oleate was added to the solution of aluminium trichloride and thionyl chloride in ethyl bromide at about —5° C. over 2 hours, under nitrogen. The solution was allowed to warm up to room temperature overnight. Water was added and the aqueous layer separated. The ethyl bromide was then removed and replaced with carbon tetrachloride. The solution was heated for 1 hour, the aqueous layer separated and the carbon tetrachloride layer washed three times with distilled water (washings neutral). The solution was dried over sodium sulphate and the solvent removed under reduced pressure.

The product had a chlorine content of 8.35% wt., sulphur content of 2.2% wt. and an aluminium content of nil.

Additive Q

Reactant used:
Butyl oleate (dry)—82 g., 0.24 mole
Thionyl chloride (redistilled)—13.9 g., 0.117 mole
Ethyl bromide (dry)—200 ml.

The procedure was the same as for Additive B. The product had a chlorine content of 0.33% wt. and a sulphur content of 0.08% wt.

Blends of Additives A, P, B and Q were made in an SAE 90 grade refined mineral lubricating oil from a Middle East crude petroleum and the load-carrying properties of the blends were assessed by the Shell Four Ball Tester. The results are shown in the following table.

TABLE

| Additive | Percent wt. concn. in SAE 90 oil | Mean Hertz load, kg. | 2½ seconds seizure delay load, kg. | Welding load, kg. | Initial seizure load, kg. |
|---|---|---|---|---|---|
| A | 3.5 | 68.3 | 120 | 510 | 85 |
| P | 3.5 | 26.9 | 94 | 150 | 70 |
| B | 3.59 | 56.0 | 90–100 | 400 | 85 |
| Q | 3.59 | 31.0 | 90 | 200 | 75 |

The good EP properties imparted to the lubricating oils by the additives according to the invention are clearly shown.

We claim:
1. A method of preparing a sulphur- and chlorine- containing additive for lubricating oils to improve the extreme pressure properties thereof which comprises reacting, under non-polymerizing conditions, an olefinically unsaturated compound having 4–35 carbon atoms and no free hydroxyl groups, said compound being selected from the group consisting of olefins and aliphatic esters, with thionyl chloride in the presence of a Friedel-Crafts catalyst at a temperature within the range 50° C. to —50° C. and employing 0.1 to 10 moles of olefinically unsaturated compound per mole of thionyl chloride and a molar amount of thionyl chloride which is not less than the molar amount of Friedel-Crafts catalyst.

2. A lubricating composition having improved extreme pressure properties consisting essentially of a major amount of lubricating base oil and from 0.1 to 10% by weight of the total composition of a sulphur- and chlorine-containing additive prepared in accordance with claim 1.

3. A method according to claim 1 wherein the Friedel-Crafts catalyst is selected from the group consisting of aluminium chloride, zinc chloride, antimony chloride, ferric chloride, stannic chloride, titanium tetrachloride, boron trifluoride, and hydrogen fluoride.

4. A method according to claim 1 wherein the reaction is carried out at a temperature within the range 10° C. to —10° C.

5. A method according to claim 1 wherein the reaction is carried out using 0.5 to 3 moles of the olefinically unsaturated compound per mole of thionyl chloride.

References Cited
UNITED STATES PATENTS

| | | | |
|---|---|---|---|
| 3,346,549 | 10/1967 | Ford et al. | 252—48.4 XR |
| 2,244,886 | 6/1941 | Lincoln et al. | 252—48.8 |
| 2,549,425 | 4/1951 | Cashman et al. | 252—48.4 |
| 2,827,434 | 3/1958 | Wierber | 252—48.4 |
| 3,081,294 | 3/1963 | Beynon et al. | 252—48.8 |
| 3,231,558 | 1/1966 | McMillen | 200—139 |

DANIEL E. WYMAN, *Primary Examiner.*

W. H. CANNON, *Assistant Examiner.*